(12) United States Patent
Warren

(10) Patent No.: US 6,663,059 B1
(45) Date of Patent: Dec. 16, 2003

(54) ARCHERY BOW HOLDER

(76) Inventor: Brian L. Warren, 14445 S. 25th St., Roca, NE (US) 68430

(*) Notice: Subject to any disclaimer, the term of this patent is extended or adjusted under 35 U.S.C. 154(b) by 0 days.

(21) Appl. No.: 10/420,025

(22) Filed: Apr. 21, 2003

(51) Int. Cl.⁷ .............................. A45F 3/44; A47F 5/00
(52) U.S. Cl. .................... 248/156; 248/126; 248/309.1; 248/558; 124/86
(58) Field of Search ................................. 248/156, 530, 248/532, 533, 309.2, 316.8, 126, 558, 309.1; 124/86, 88; 182/187

(56) References Cited

U.S. PATENT DOCUMENTS

| | | | |
|---|---|---|---|
| 3,219,299 A | 11/1965 | Snider et al. | 248/156 |
| 3,256,872 A | 6/1966 | Koser | 124/23 |
| 3,926,393 A | 12/1975 | Tainsh | 248/165 |
| 3,991,780 A | 11/1976 | Maroski, Jr. | 135/66 |
| 4,144,971 A * | 3/1979 | Balibrea | 211/64 |
| 4,708,221 A | 11/1987 | Kubiak | 182/187 |
| 4,846,140 A | 7/1989 | DiMartino | 248/360 |
| 4,854,066 A | 8/1989 | Canterbury, Sr. | 42/94 |
| 4,936,415 A | 6/1990 | Williams | 182/187 |
| 5,039,052 A * | 8/1991 | Carafice | 248/309.1 |
| 5,044,590 A * | 9/1991 | Carafice | 248/309.1 |
| 5,106,044 A | 4/1992 | Regard, III et al. | 248/169 |
| 5,111,800 A | 5/1992 | Reynolds | 124/88 |
| 5,240,211 A | 8/1993 | Anderson | 248/125 |
| 5,377,657 A * | 1/1995 | Foster et al. | 124/86 |
| D376,832 S | 12/1996 | Mills | D22/107 |
| 5,619,981 A | 4/1997 | Breedlove | 124/89 |
| 5,622,342 A * | 4/1997 | Mills | 248/126 |
| D379,399 S | 5/1997 | Reinaker | D22/113 |
| 5,630,568 A | 5/1997 | Lubrecht | 248/217.4 |
| 5,680,939 A * | 10/1997 | Oliver | 211/64 |
| 5,775,658 A * | 7/1998 | Englehardt | 248/309.1 |
| 5,819,462 A * | 10/1998 | Dockery | 42/94 |
| 5,967,475 A * | 10/1999 | Johnson | 248/217.4 |
| 6,086,026 A | 7/2000 | Pearce | 248/127 |
| 6,131,556 A | 10/2000 | Villarreal | 124/86 |
| 6,205,992 B1 | 3/2001 | Meeks et al. | 124/86 |
| 6,349,905 B1 * | 2/2002 | Mills | 248/126 |
| 6,425,765 B1 | 7/2002 | Irwin, III | 434/247 |
| 6,457,685 B1 * | 10/2002 | Taylor | 248/166 |
| 6,561,477 B1 * | 5/2003 | Prive | 248/339 |
| 2002/0066446 A1 | 6/2002 | Kesti | 124/86 |

* cited by examiner

Primary Examiner—Anita King
(74) Attorney, Agent, or Firm—Thomte, Mazour & Niebergall; Dennis L. Thomte

(57) ABSTRACT

An archery bow holder is disclosed which may be attached to a tree stand or which may be implanted into the ground. The bow holder includes a elongated support having upper and lower ends with an externally threaded portion positioned thereon above the lower end thereof. If the bow holder is going to be used on the ground, a leg assembly is threaded onto the externally threaded portion of the support. If the bow holder is going to be used in conjunction with a tree stand, an attachment bracket assembly is threaded onto the externally threaded portion of the support with the attachment bracket assembly being secured to the tree stand.

14 Claims, 4 Drawing Sheets

ARCHERY BOW HOLDER

BACKGROUND OF THE INVENTION

1. Field of the Invention

This invention relates to an archery bow holder and more particularly to an archery bow holder which may be used on a tree stand or which may be implanted into the ground.

2. Description of the Related Art

Bow hunters spend long periods of time in the pursuit of game while the hunter is stationed either in a tree stand or in some location on the ground. It becomes tiresome for the hunter to constantly manually support the bow in an upright position so that it will be conveniently available should an animal appear. Many types of bow supports, stands or holders have been provided for supporting the bow in a generally upright position on a tree stand. Further, many bow supports, holders or stands have been previously provided which enable the hunter to support the bow in a generally upright position when the hunter is in a blind or on the ground or some other location. Heretofore, to the best of applicant's knowledge, no one has previously provided a bow holder which may be used not only on a tree stand but may also be implantable into the ground when the hunter is not in a tree stand.

SUMMARY OF THE INVENTION

A bow holder is described for use with a tree stand or which may be implanted into the ground when the hunter is not positioned in a tree stand. The bow holder of this invention includes an elongated support having upper and lower ends and a pair of horizontally spaced-apart arms secured to and extending generally horizontally from the elongated support at the upper end thereof which are adapted to receive the lower limb of a bow therebetween. The lower end of the elongated support is adapted to be selectively implanted into the ground. The elongated support has an externally threaded portion provided thereon above its lower end. A ground engageable support leg assembly is also provided which may be selectively threadably mounted on the externally threaded portion of the elongated support to stabilize the bow holder when the lower end of the elongated support is implanted into the ground. A tree stand attachment bracket is selectively threadably secured to the externally threaded portion on the elongated support when the bow holder is to be attached to a tree stand and the support leg assembly has been removed from the elongated support. The tree stand attachment bracket extends laterally from the elongated support, when threadably mounted thereon, for connection to a tree stand. The tree stand attachment bracket includes a first bracket portion which is selectively threadably mounted on the externally threaded portion of the elongated support which extends laterally therefrom and a second bracket portion which is selectively rotatably secured, about a generally horizontal axis, to the first bracket portion and which extends laterally therefrom for attachment to a tree stand. The first bracket portion may be selectively rotated with respect to the second bracket portion so that the first bracket portion is generally horizontally disposed regardless of the attitude of the second bracket portion.

It is therefore a principal object of the invention to provide an improved bow holder.

A further object of the invention is to provide a bow holder which may be used in a tree stand and which may be used when the hunter is not in the tree stand.

Yet another object of the invention is to provide a bow holder which is convenient to use.

Yet another object of the invention is to provide a bow holder including adjustable attachment means to compensate for angular variations of the tree stand.

These and other objects of the invention will be apparent to those skilled in the art.

DESCRIPTION OF THE PREFERRED EMBODIMENT

Figure 1:
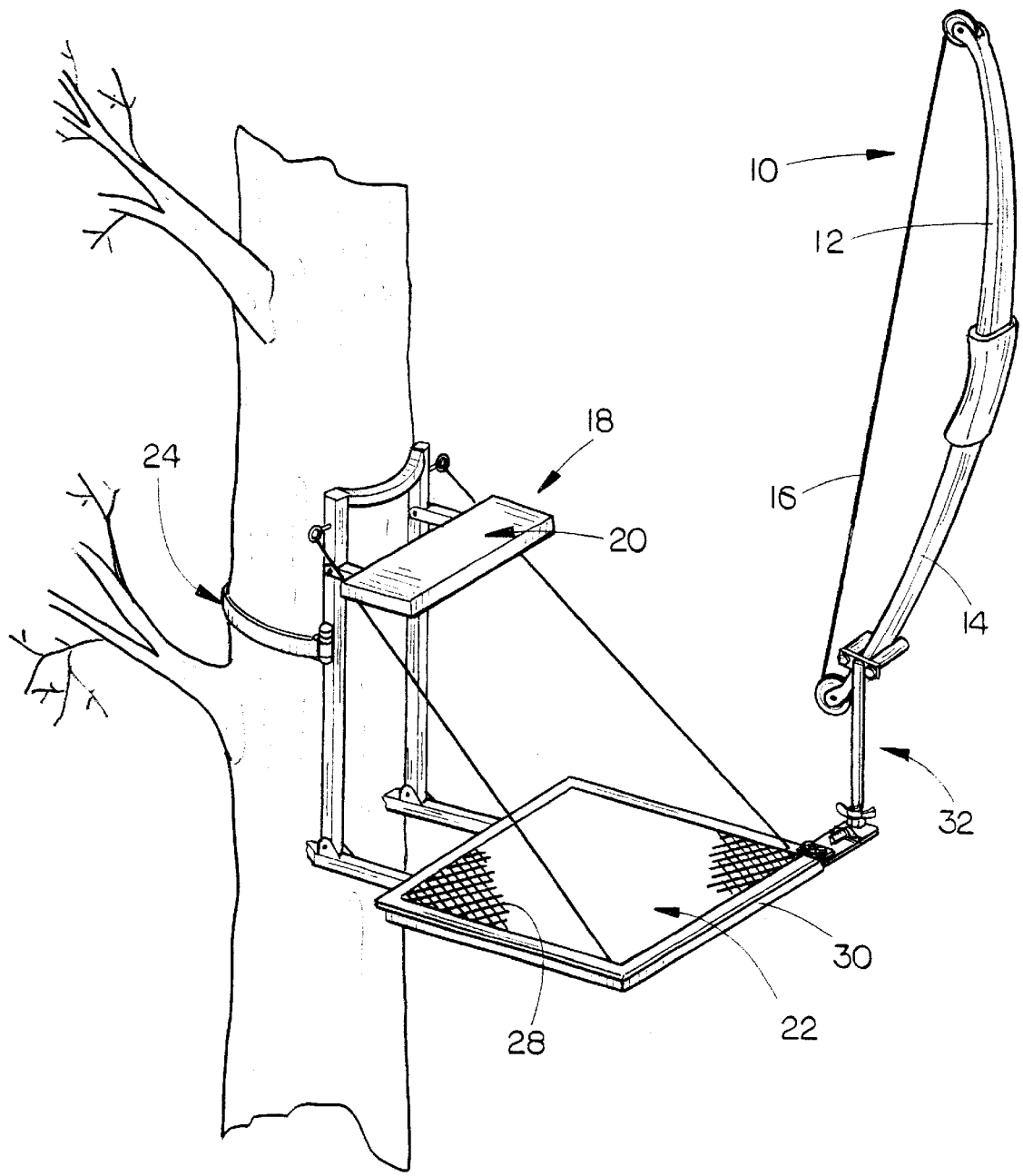
FIG. 1 is a perspective view illustrating the bow holder of this invention secured to a tree stand.

The numeral 10 refers to a conventional archery bow having an upper limb 12, a lower limb 14 and a bow string 16. The numeral 18 refers to a tree stand which may take a variety of different shapes but which normally has a seat 20, a foot rest 22 and an attachment means 24 for securing the tree stand 18 to a tree 26 at a location above the ground. The foot rest 22 may be of solid metal or wood construction or may be comprised of a metal open mesh material 28 having a frame 30 extending therearound, as seen in FIG. 1. In many cases, it is difficult, if not impossible, to mount the tree stand 18 on the tree 26 so that the foot rest 22 is perfectly level.

Figure 2:
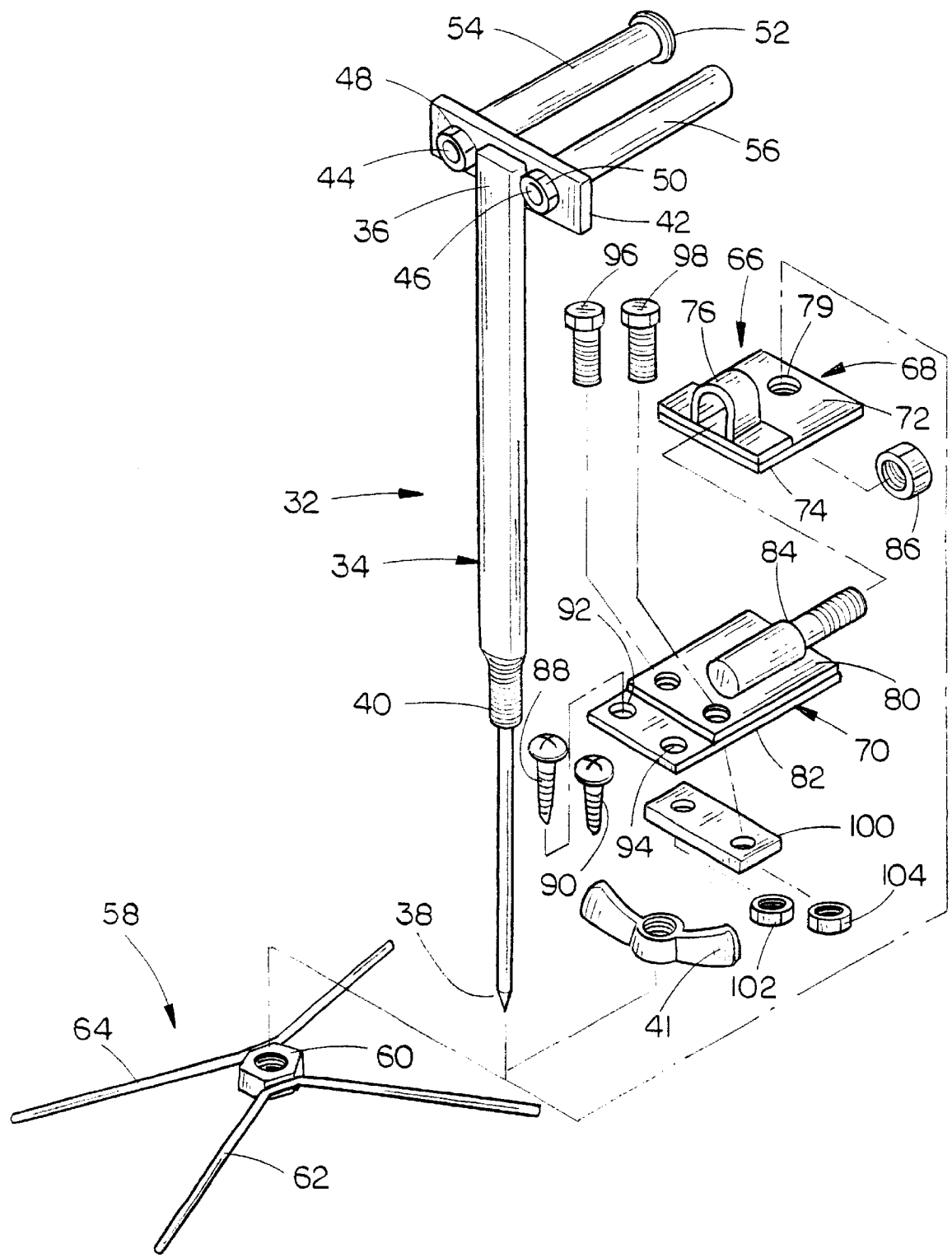
FIG. 2 is an exploded partial perspective view of the bow holder of this invention.

The bow holder of this invention is referred to by the reference numeral 32 and is designed for use with a tree stand of almost any design or which my be implanted into the ground. Bow holder 32 includes an elongated support 34 having an upper end 36, a pointed lower end portion 38, and an externally threaded portion 40 positioned above the lower end portion 38. Lock nut 41 which preferably is a wing nut is threadably mounted on externally threaded portion 40. Plate 42 is welded to the upper end 36 of support 34 in a transverse relationship thereto, as seen in FIG. 2. A pair of support members 44 and 46 are longitudinally threadably adjustably secured to plate 42 and maintained in selected positions by nuts 48 and 50, respectively, and extend laterally therefrom, as seen in FIG. 2. The length of the support members 44 and 46 which extend from plate 42 may be adjusted to conform to the width of the particular bow limb being supported therein. Support member 44 has an enlarged head portion 52 at its outer end which aids in preventing the bow from inadvertently becoming dislodged therefrom. It is preferred that plastic tubes 54 and 56 embrace support members 44 and 46, respectively, to provide a gripping surface and to prevent damage to the bow.

A ground engaging support leg or stabilizing assembly 58 is selectively mounted on support 34 when the bow holder 32 is to be implanted in the ground. Assembly 58 includes a nut 60 having a pair of generally U-shaped or V-shaped leg members 62 and 64 welded thereto which extend outwardly and downwardly therefrom. Although the support 34 may be implanted into the ground without using the assembly 58, it is recommended that the assembly 58 be utilized since it provides a stabilizing effect to the support 34.

The numeral 66 refers to an attachment bracket assembly which is used with the support 34 when the bow holder 32 is going to be mounted on a tree stand. Bracket assembly 66 generally includes bracket portions 68 and 70. For description purposes, bracket portion 68 will be described as having an upper surface 72 and a lower surface 74. A tube 76 is welded to upper surface 72, as seen in FIG. 2. Nut 78 is welded to lower surface 74 and registers with an opening 79 formed in bracket portion 68.

For purposes of description, bracket portion 70 will be described as having an upper surface 80 and a lower surface 82. Bolt 84 is welded to upper surface 80 and extends laterally from bracket portion 70 for rotatable reception by tube 76 on bracket portion 68. Nut 86 is threaded onto the end of bolt 84 to enable bracket portion 68 to be selectively rotatably disposed with respect to bracket portion 70.

Bracket portion 70 may be attached to the tree stand 18 by screws 88, 90 extending through openings 92, 94 formed in bracket portion 70 with the screws 88, 90 being screwed into the foot rest 22. Bracket portion 70 may also be secured to foot rest 22 by clamping the bracket portion 70 to the mesh 28 of foot rest 22 by the bolts 96, 98 extending through bracket portion 70, the mesh 28 and plate 100 with nuts 102, 104 mounted on bolts 96, 96.

If the hunter is going to be positioned in a tree stand, such as illustrated in FIG. 1, the attachment bracket assembly 66 will be utilized with the bow holder 32 rather than the support leg assembly 58. The lower end of support 34 is inserted downwardly through the bracket portion 68 so that the externally threaded portion is threadably received by the nut 78. The bracket portion 70 is then secured to the foot rest 22 as previously described. It should be noted that the bracket assembly 66 could be mounted on the foot rest 22 prior to the support 34 being threadably secured to the assembly 66. At any rate, once the assembly 66 has been secured to the tree stand, the support 34 is rotated with respect to bracket portion 68 until the support members. 44 and 46 are facing in the desired direction which will usually be so that they extend laterally away from the tree stand or laterally towards the tree stand. Once the support 34 has been properly positioned, the wing nut 41 is tightened against the upper surface of the bracket portion 68 to prevent rotation of support 34 with respect thereto. If the foot rest 22 is not perfectly level, the bracket portion 68 may be rotated with respect to bracket portion 70 so that the support 34 is in an upright or substantially vertically disposed position.

The bow is then supported between the support members 44 and 46, as illustrated in FIG. 1, so that the bow is conveniently available to the hunter should an animal approach the tree stand.

Figure 4:
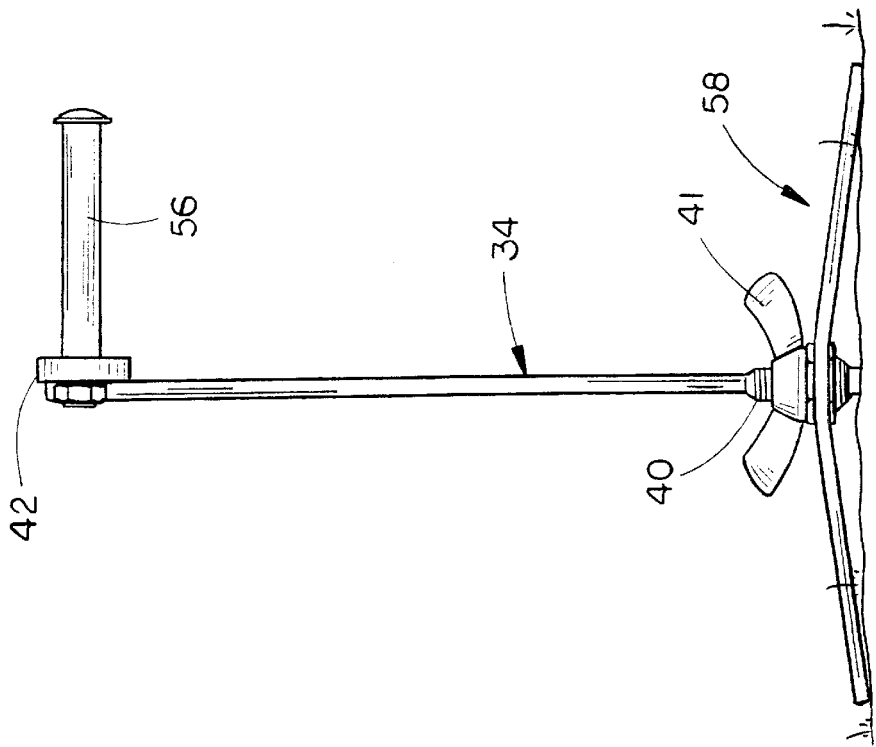
FIG. 4 is a side view of the bow holder of FIG. 3.
Figure 3:
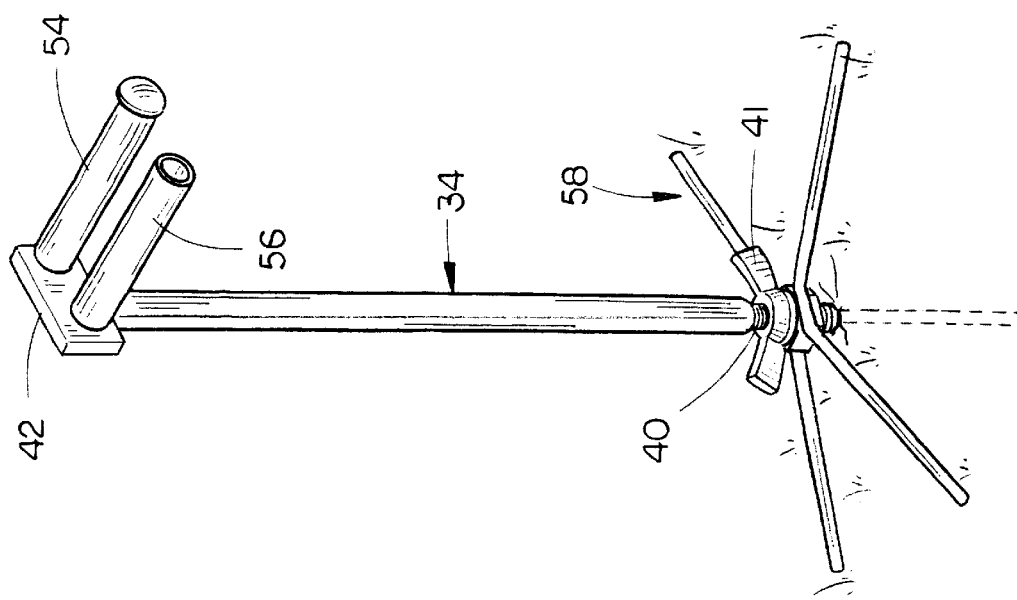
FIG. 3 is a perspective view illustrating the bow holder being used on the ground.
Figure 5:
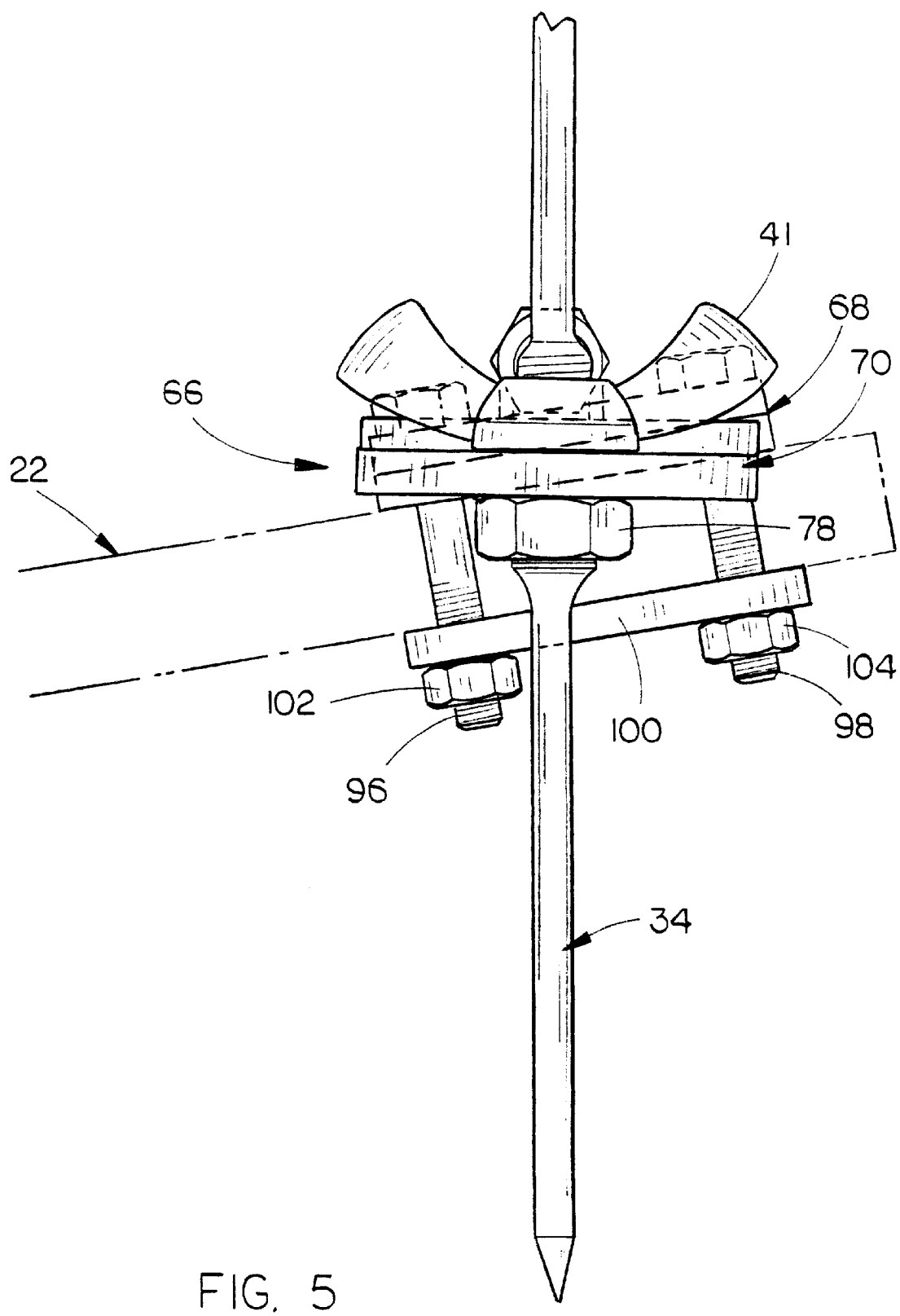
FIG. 5 is a side elevational view of the bow holder being mounted on a tree stand.

If the hunter is not going to be positioned in a tree stand but is going to be positioned in a blind or on the ground, the attachment bracket assembly 66 is removed from the support 34 and support leg assembly 58 is threadably mounted on the support 34 by threading the nut 60 onto the externally threaded portion 40. The lower end of support 34 is then implanted into the ground until the leg members 62 and 64 engage the ground, as illustrated in FIGS. 3 and 4. The support member 34 is rotated with respect to the leg assembly 58 until the support members 44 and 46 are in the proper direction with respect to the hunter, at which time the lock nut 41 is tightened against nut 60 to prevent rotation of support 34 with respect to leg assembly 58.

Thus it can be seen that a novel archery bow holder has been provided which enables the bow holder to be used in conjunction with a tree stand or to be used by implanting the same into the ground. It can therefore be seen that the invention accomplishes at least all of its stated objectives.

I claim:

1. An archery bow holder for use with a tree stand or which may be implantable into the ground, comprising:

an elongated support having upper and lower ends;

a pair of horizontally spaced-apart arms secured to and extending generally horizontally from said elongated support at the upper end thereof which are adapted to receive the lower limb of a bow therebetween;

said lower end of said elongated support adapted to be implanted into the ground;

said elongated support having an externally threaded portion above its lower end;

a ground engageable support leg assembly which may be selectively threadably mounted on said externally threaded portion of said elongated support to stabilize said bow holder when said lower end of said elongated support is implanted into the ground;

a tree stand attachment bracket selectively threadably secured to said externally threaded portion on said elongated support when the bow holder is to be attached to a tree stand and said support leg assembly has been removed from said elongated support;

said tree stand attachment bracket extending laterally from said elongated support, when threadably mounted thereon, for connection to a tree stand.

2. The archery bow holder of claim 1 wherein said tree stand attachment bracket includes a first bracket portion which is selectively threadably mounted on said externally threaded portion of said elongated support which extends laterally therefrom and a second bracket portion which is selectively rotatably secured, about a generally horizontal axis, to said first bracket portion and which extends laterally therefrom for attachment to a tree stand.

3. The archery bow holder of claim 2 wherein said second bracket portion includes a clamping assembly thereon.

4. The archery bow holder of claim 2 wherein said second bracket portion includes screw openings formed therein.

5. The archery bow holder of claim 2 wherein said first bracket portion has upper and lower surfaces and has a tubular support secured to its upper surface; said second bracket portion having upper and lower surfaces, said second bracket portion having a threaded bolt secured to its upper surface which extends therefrom through said tubular support, and a nut on said threaded bolt for maintaining said threaded bolt in said tubular support and for maintaining said second bracket portion in various angular relationships with respect to said first bracket portion.

6. The archery bow holder of claim 1 wherein a lock nut is threadably mounted on said externally threaded portion of said elongated support.

7. The archery bow holder of claim 6 wherein said lock nut is positioned above said support leg assembly when said lower end of said elongated support is implanted into the ground.

8. The archery bow holder of claim 6 wherein said lock nut is positioned above said attachment bracket when the bow holder is used in conjunction with a tree stand.

9. The archery bow holder of claim 6 wherein said lock nut comprises a wing nut.

10. The archery bow holder of claim 1 wherein said lower end of said elongated support is pointed.

11. The archery bow holder of claim 1 wherein said ground engageable support leg assembly comprises a nut having a pair of generally U-shaped leg assemblies welded thereto which extend laterally and downwardly therefrom.

12. The archery bow holder of claim 1 wherein said spaced-apart arms are longitudinally mounted on said elongated support.

13. The archery bow holder of claim 1 wherein said spaced-apart arms have outer ends and wherein the outer end of at least one arm has an enlarged head portion thereon.

14. The archery bow holder of claim 1 wherein a plate is secured to said elongated support at the upper end thereof, said spaced-apart arms being threadably secured to said plate.

* * * * *